United States Patent [19]

Reh

[11] Patent Number: 4,672,838
[45] Date of Patent: Jun. 16, 1987

[54] BEARING FRICTION TESTER

[75] Inventor: Kim R. Reh, La Verne, Calif.

[73] Assignee: General Dynamics, Pomona Division, Pomona, Calif.

[21] Appl. No.: 836,207

[22] Filed: Feb. 27, 1986

Related U.S. Application Data

[63] Continuation of Ser. No. 572,041, Jan. 19, 1984, abandoned.

[51] Int. Cl.$^4$ ............................................ G01D 21/02
[52] U.S. Cl. .......................................................... 73/9
[58] Field of Search ...................... 73/9, 10, 432 V, 593

[56] References Cited

U.S. PATENT DOCUMENTS

| | | | |
|---|---|---|---|
| 1,117,187 | 11/1914 | Hess | 73/9 |
| 2,198,278 | 4/1940 | Van Der Heiden | 264/1 |
| 2,296,657 | 9/1942 | Wallace | 73/9 |
| 2,378,614 | 6/1945 | Zahn | 73/9 |
| 2,471,423 | 5/1949 | Gisser | 73/9 |
| 2,796,759 | 6/1957 | Baugh et al. | 73/67 |
| 2,887,875 | 5/1959 | Curriston | 73/9 |
| 2,928,275 | 3/1960 | Wadsworth | 73/9 |
| 3,040,560 | 6/1962 | Stupp | 73/9 |
| 3,139,748 | 7/1964 | Sturm, Jr. | 73/67 |
| 3,178,928 | 4/1965 | Howe | 73/9 |
| 3,511,079 | 5/1970 | Musser | 73/9 |
| 3,518,872 | 7/1970 | Tiner et al. | 73/9 |
| 3,580,059 | 5/1971 | Dalton | 73/432 |
| 3,979,945 | 9/1976 | Kopito et al. | 73/60 |
| 4,173,885 | 11/1979 | Matlock | 73/9 |

FOREIGN PATENT DOCUMENTS

| | | | |
|---|---|---|---|
| 783646 | 11/1980 | U.S.S.R. | 73/9 |

Primary Examiner—Kenneth M. Schor
Attorney, Agent, or Firm—Neil F. Martin; R. Ben Miller; Edward B. Johnson

[57] ABSTRACT

A bearing friction testing apparatus includes a bearing support structure having a support arm with a bearing mount for mounting a test bearing with a bi-directional load support ring for attachment to the bearing race with a pendulum attachable to the support ring for adding one direction of force and a tension line attached to the ring for applying a second direction of force transverse to the first direction of force with a pendulum latching device for latching the pendulum in a loaded position and releasing the pendulum with a measuring instrument for measuring the rate of decay in the amplitude of oscillation of the pendulum.

12 Claims, 7 Drawing Figures

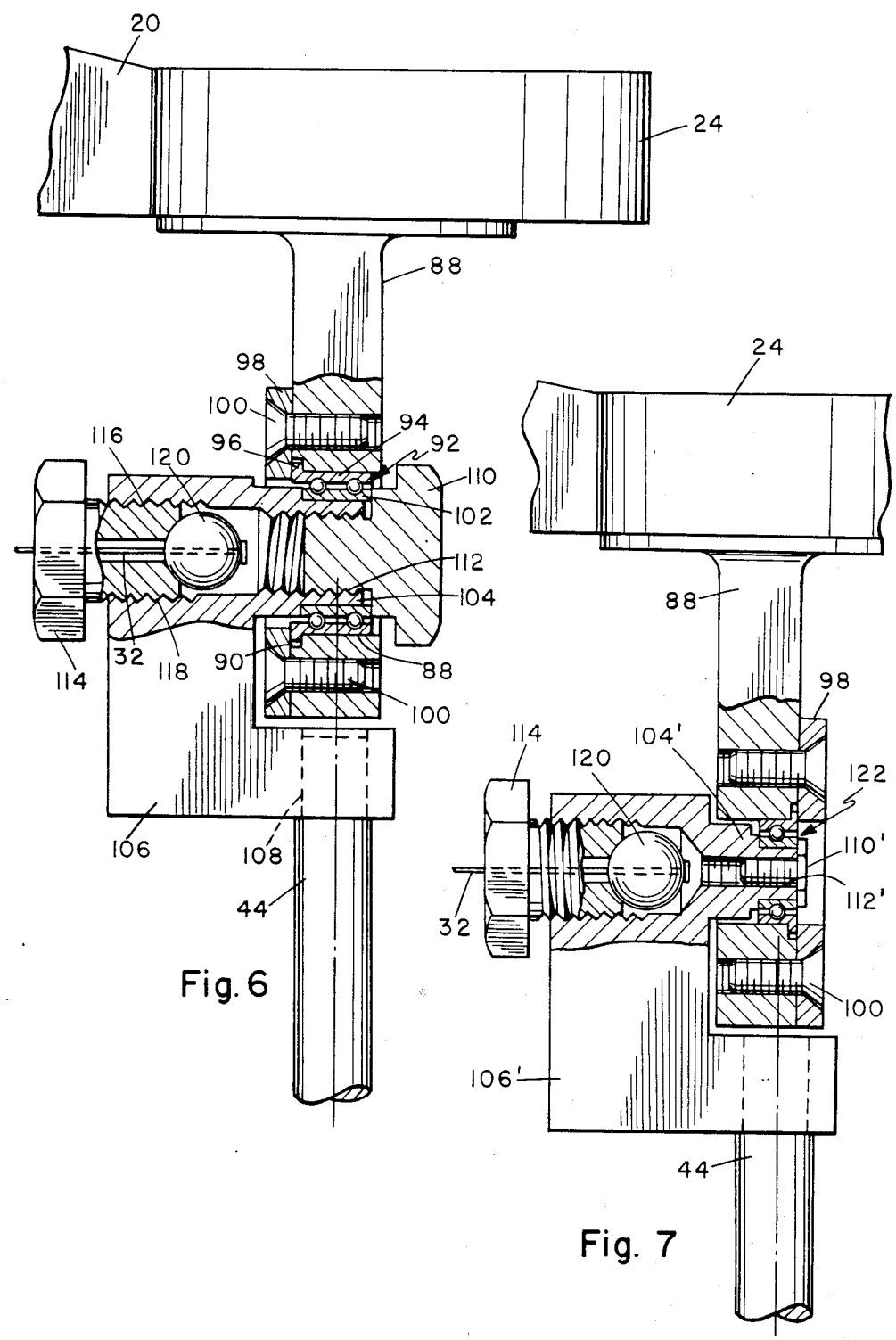

BEARING FRICTION TESTER

The U.S. Government has rights in this invention pursant to Contract No. N00024-79-C-5202, awarded by the U.S. Navy.

This is a continuation of application Ser. No. 572,041 filed Jan. 19, 1984, now abandoned.

BACKGROUND OF THE INVENTION

The present invention relates to test instruments and pertains particularly to a bearing friction testing instrument.

An accurate measure of the friction in bearings is an important parameter in the design of many types of machinery. The frictional load is a critical feature in the design of gyroscopes in order to accurately calculate the precession rate. The bearing friction load is also an important consideration in the design of motors in determining the power load on the motor as well as determining heat generated as a result of friction in the bearings.

The load on the bearings can be in both the axial direction as well as the radial direction and the measurement of both directional loads or the friction as a result of both directional loads is an important consideration.

While devices have been available in the past for measuring friction due to one or the other of the directional loads on bearings, no devices have been available which are capable of accurately loading both the axial direction as well as the radial direction of the bearing and measuring the friction thereof.

It is therefore desirable that a device be available which is capable of quickly and easily simultaneously loading (in both the axial and radial direction of a bearing) and measuring the resulting friction.

SUMMARY AND OBJECTS OF THE INVENTION

It is therefore the primary object of the present invention to provide an improved bearing loading and testing apparatus.

In accordance with the primary aspect of the present invention, a bearing friction testing apparatus includes support means for supporting a bearing with a first loading means for loading the bearings axially and a second loading means for loading the bearings radially with pendulum means supported by the bearings and means for measuring the rate of decay of oscillations of the pendulum to thereby ascertain the friction in the bearings.

BRIEF DESCRIPTION OF THE DRAWINGS

The above and other objects and advantages of the present invention will become apparent from the following description when read in conjunction with the drawings wherein:

FIG. 6 is a view similar to FIG. 5, with a dual race bearing under test; and

FIG. 7 is a further similar view showing a single race bearing installed.

Referring to FIG. 1 of the drawing, a bearing frictional testing apparatus in accordance with the invention is illustrated and designated generally by the numeral 10. This testing apparatus includes a generally circular flat base or platform 12 mounted on a plurality of adjustable jacks 14 having a seat 16. Mounted on the support platform 12 is a vertically oriented cylindrical mast 18 on which is mounted a horizontal arm 20 at the upper end thereof. Arm 20 includes a clamp member 22 for clamping the arm to adjustable positions on the vertical mast 18. The outer end of the arm 20 includes a bearing holder mount 24 in the from of a ring with a cylindrical bore formed therein. The bearing holder mount 24 is adapted to receive a gimbal post 26 (FIGS. 1-5) or a bearing holding fixture (FIGS. 6 and 7).

Figure 1:
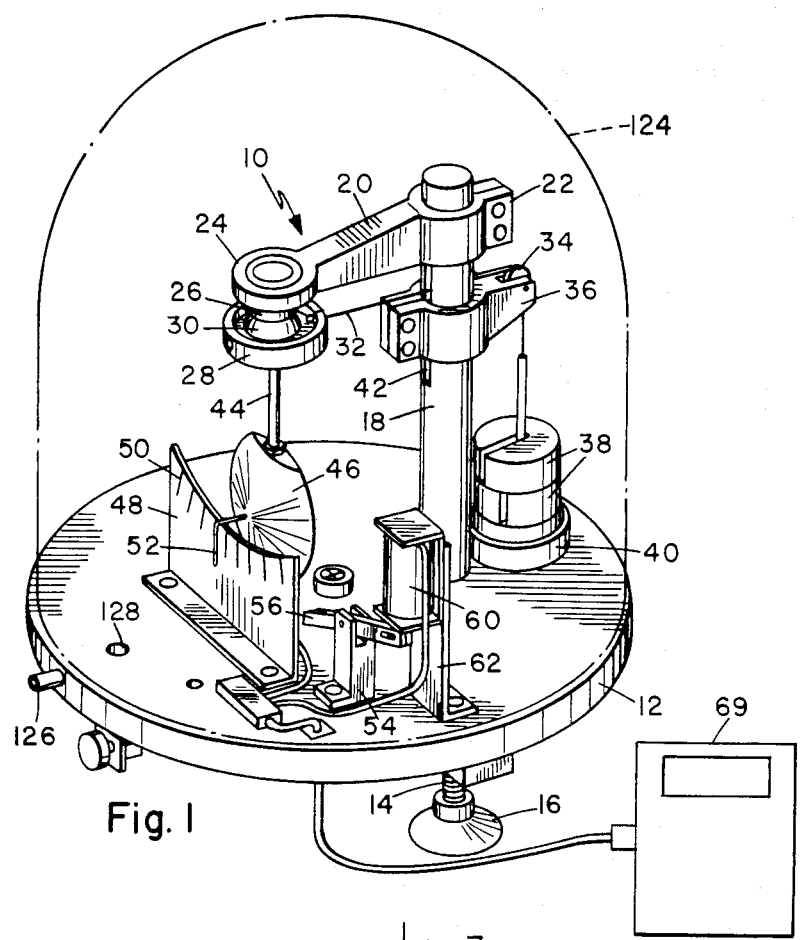
FIG. 1 is a perspective view of a preferred embodiment of the invention.

A biaxial load support ring 28 is adapted to be mounted for applying a load on a bearing 30 such as through a gimbal and includes a tension wire 32 extending over a pulley 34 mounted on an arm 36 on the mast 18 for supporting a plurality of weights 38 which are prevented from swinging by a guide 40 for providing a lateral load on the ring 28. The tension wire 32 extends through a slot 42 formed in the vertical mast 18 over pulley 34 and down to the weight 38 and guide 40.

A pendulum including a rod 44 and a weight 46 is secured to the biaxial load support ring 28 for applying the axial load to the gimbal assembly which results in a radial load on the bearings as will be discussed. This same ring and pendulum can be used to apply an axial load on certain spherical and self-aligning bearings.

Figure 3:
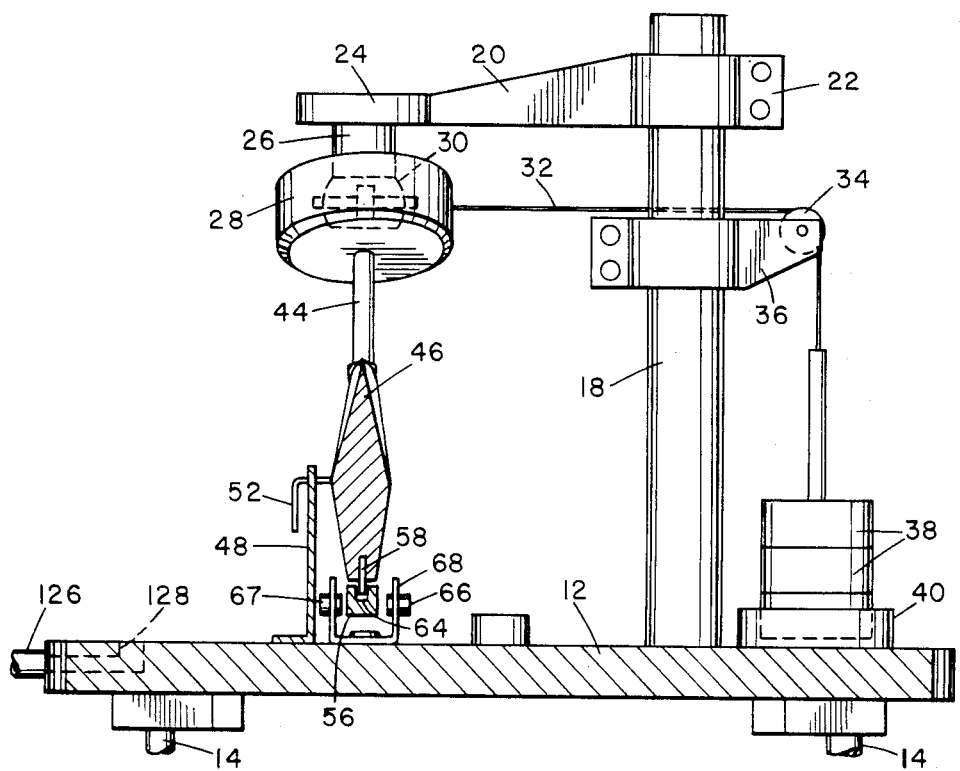
FIG. 3 is an enlarged sectional view taken on line 3—3 of FIG. 2.
Figure 4:
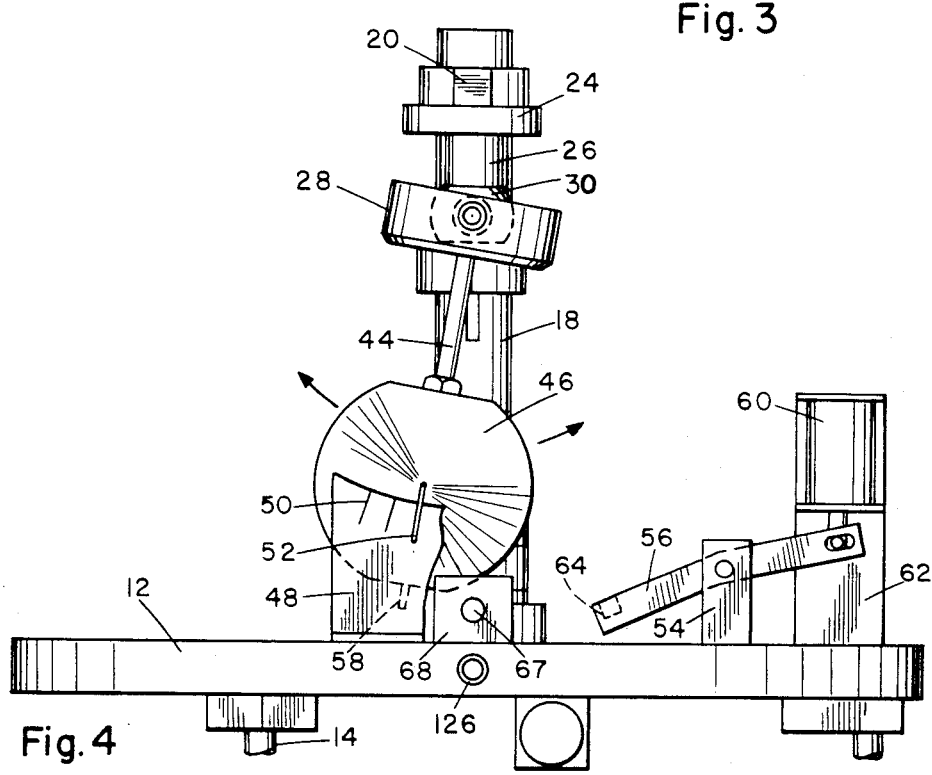
FIG. 4 is an enlarged view similar to FIG. 3, showing operation of the device under test conditions.

A swing scale includes a panel 48 attached to and extending upward from the platform and includes a indicator scale 50 formed along an upper arcuate edge thereof. An indicator arm or marker 52 carried by the pendulum weight 46 extends over and down beside the scale 50 to provide an indication of the position of the pendulum 44, 46 (e.g. at the end of its stroke). A pendulum latch and release mechanism includes a bracket 54 secured to and extending upward from the base platform 12 substantially in line with the swing of the pendulum 44, 46. A slotted latch arm 56 is pivotally mounted in the bracket 54 and is connected at its outer end to an electromagnet actuator 60. The electromagnetic release actuator 60 is mounted on a vertical support bracket 62 mounted on the support platform 12. The pendulum latch/indicator pin 58 engages a slot 64 in the latch arm 56 as shown in FIGS. 3 and 4 for holding the pendulum in the loaded position.

An optoelectronic counter mechanism includes sensing elements 66 and 67 mounted on a bracket 68 supported on the platform 12. These are connected through a suitable electrical circuit to a counter 69. The pendulum 44, 46, as it swings to and fro, passes its indicator pin 58 between the elements 66 and 68 on each swing thereof, thus signaling a count of its swings on the counter 69.

Figure 5:
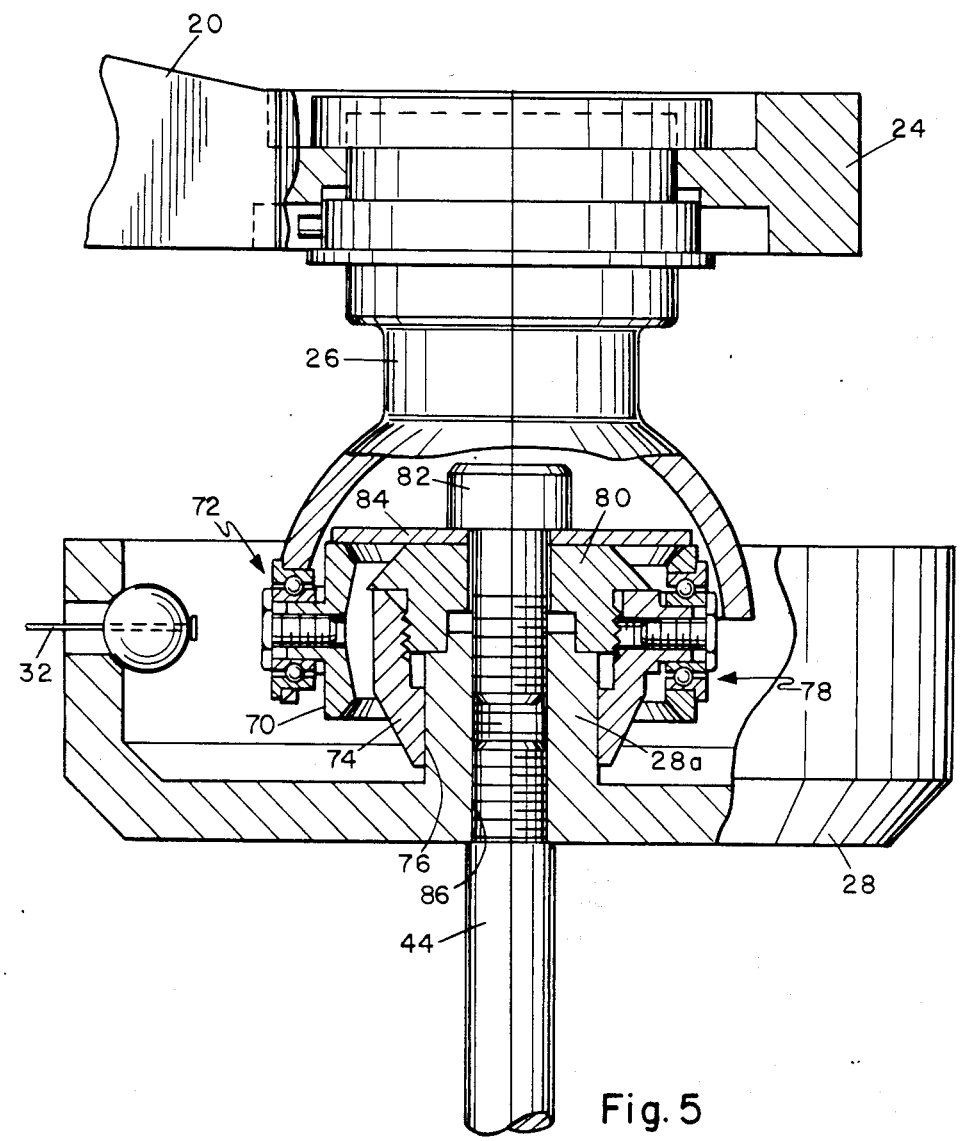
FIG. 5 is an enlarged side elevation view of the bearing and pendulum head assembly, with portions cut away to show a gimbal type bearing under test.

Referring particularly to FIG. 5, a gimbal assembly is shown with the gimbal support post 26 mounted within the mounting ring 24 on the support arm 20. The illustrated section shows 90 degree sections of the gimbal assembly with the 90 degree sections extending in a plane at 90 degrees to one another through the center axis of the inner gimbal bearing mount and pendulum support rod 44. The gimbal assembly includes an outer gimbal ring 70 which is mounted by means of a pair of opposed coaxially positioned gimbal bearings 72, only one of which is shown, for support on the gimbal post 26. An inner gimbal ring 74 having a bearing mount 76 is mounted by means of a pair of coaxially opposed gimbal bearings 78 for supporting the inner gimbal for pivotal movement at right angles to the pivotal axis of the outer ring 70.

The biaxial load support ring 28 includes a cylindrical portion 28a fitting within the inner gimbal bearing mount bore 76 and is secured in place by means of a screw 82 extending through a bore in a lock bar 84 for locking the inner gimbal to the outer and through a bearing mount to support ring retainer 80. The screw 82 extends and threadably engages the biaxial load ring 28 in a bore 86 which also threadably receives the upper threaded end of the pendulum support rod 44. With this arrangement a pair of bearings 72 are loaded axially with the ring 28 and the weights 38 attached to the tension wire 32. The bearings are loaded radially by means of the pendulum weight 46 supported on the pendulum rod 44.

Referring to FIGS. 6 and 7, a monobearing test adaptor is illustrated as supporting a duplex or double race bearing unit and a single bearing unit respectively. With particular reference to FIG. 6, a monobearing holding fixture 88 is mounted in the mount 24 in a manner substantially identical to that of the gimbal post of the previous embodiment and includes a bearing holder in the outer end thereof comprising a transverse cylindrical bore 89 including a radially stepped bore section 90. This mounting bore is adapted to receive a bearing such as duplex unit 92 having an outer race 94 with a radial flange 96 for extending into the radially stepped bore 90 for engagement by retaining ring 98, clamped by a plurality of screws 100 to the holding fixture 88. The bearing assembly 92 is illustrated as a double unit or double roll ball bearing unit including an inner race 102 which is engaged by a cylindrical shaft or projection 104 of a bearing swing arm coupler 106 to which a pendulum rod support 44 is mounted in a threaded bore 108. An inner race retainer screw 110 threadably engages an inner threaded bore 112 of the bearing arm load coupler 106.

A loading ball retainer 114 substantially in the form of a cap screw having a central bore, threadably engages a threaded bore 116 in the bearing swing arm coupler 106. An axial loading wire 32 extends through a bore in retainer 114 is retained in place by means of a spherical ball 120. With this arrangement the axial load on the bearing assembly 92 is applied by the weights 38 as applied to the wire 32 while the radial load is applied by means of the pendulum weight 46 as carried by the pendulum rod 44.

Referring now to FIG. 7 wherein identical structure is identified by the same numeral and equivalent structure is identified by the same number primed, there is illustrated an arrangement for mounting and testing a single bearing unit. In this embodiment a cylindrical shaft 104' engages the inner bore of the inner race of a bearing assembly 122, which is retained in the bearing holder in substantially the same manner as in the previous embodiment. A retaining cap screw 110' threadably engages a threaded bore 112' in the cylindrical shaft 104'. This provides a mount for loading a single unit bearing assembly with axial loading being applied by means of the weights supported by the wire 32 with the radial load being applied by the pendulum on the pendulum support rod 44 as in the previous embodiments.

Figure 2:
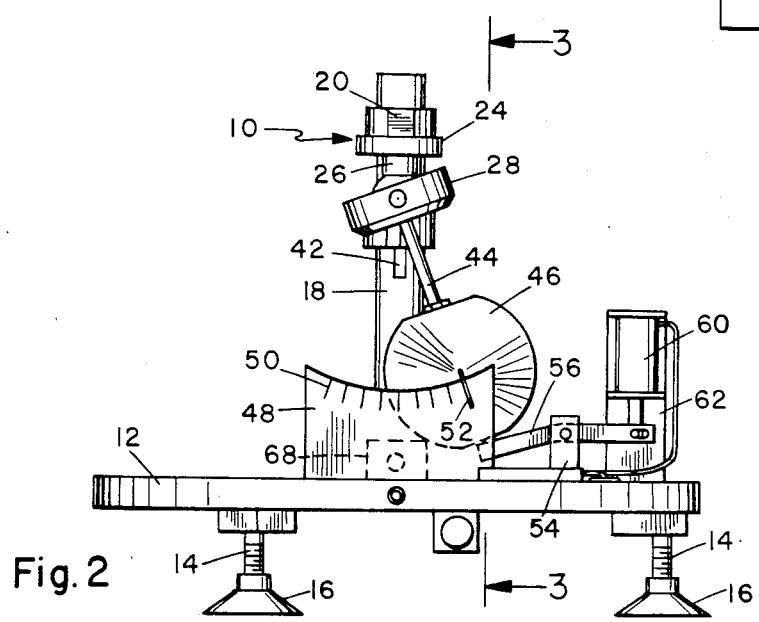
FIG. 2 is a front-elevation view of the embodiment of FIG. 1, with the pendulum latched in offset position.

In operation, a gimbal or spherical bearing to be tested which includes an inner race and an outer race is mounted within the system. In the illustrated embodiment, an outer gimbal secured to the gimbal post 26 and the inner gimbal secured in the biaxial load support ring 28. A pendulum 44, 46 of an appropriate weight is selected and attached to the pendulum support rod 44. The weight of the pendulum 44, 46 provides the axial weight or load on the gimbal or radial load on the bearing. A lateral or radial load on the gimbal is applied by means of the tension wire 32 and the weights 38 which are selected and placed on the tension wire. An airtight jar 124 is then placed on the platform 12 and sealed thereto at the lower edge. A vacuum pump is then attached to a vacuum outlet port 126 which communicates by port 128 with the interior of the vacuum bell jar 124. A vacuum is drawn in the bell jar to an appropriate level. The pendulum is previously latched in an appropriate position as shown in FIG. 2. As the test begins the release latch is activated releasing pendulum 44, 46 permitting it to swing to and fro thereby activating the counter thus providing a count of the number of swings for the decay of the swing from its initial angle or position (state 1) to a pre-selected lower angular position (state 2.

Bearing frictional torque can be calculated from empirical data by equating the loss in pendulum potential energy from State 1 to State 2 (FIGS. 2 and 4) to the frictional torque times the angle traversed. Bearing friction will be assumed to be primarily Coulomb in nature, i.e. linear decay curve, viscous effects neglectable.

$$V_1 + P_1 = V_2 + P_2 + T\theta N \tag{1}$$

where:
$P_1 = lMg \cos \theta_1 + U_1$
$P_2 = lMg \cos \theta_2 + U_2$
but, for a wire in torsion we have:
$\gamma = TwL/KG$ (Ref. M. Lindebrug, Mech. Eng. Review Manual 6th Edition, page 14-27)
$U = Tw\gamma/2$ (Energy, Potential)
$Y = \theta$
Therefore:

$$\boxed{U = \frac{KG\theta^2}{2L}} \tag{2}$$

From Equation (1):
$P_1 = P_2 + T\theta N$ Since, $V_1 = V_2 = 0$ at states 1 and 2 where the velocity changes direction. Combining equations (1) and (2) yields:

$$T\theta N = lW(\cos\theta_1 - \cos\theta_2) + \frac{KG}{2L}(\theta_1^2 - \theta_2^2) \tag{3}$$

$$T = \frac{lW}{\theta N}(\cos\theta_1 - \cos\theta_2) + \frac{KG}{2\theta NL}(\theta_1^2 - \theta_2^2)$$

Now, $\theta$ must be defined per cycle in damping down from a 20 degree to 10 degree angle of swing. From FIGS. 9 and 10 it can be seen that:

$$\theta = \theta_1 - \theta_2 \tag{4}$$

-continued $$\theta = 4\theta_1 - \left[\theta + \frac{\theta(2)}{2}\right] = \theta_1 + 2\left(\theta_1 - \frac{\theta}{2}\right) + \theta_1 - \theta$$

$$\theta = 4\theta_1 - [\theta_1 - \theta_2 + \theta_1 - \theta_2]$$

$$\boxed{\theta = 2(\theta_1 + \theta_2)}$$

By inserting Equation (4) into (3):

$$\boxed{T = \frac{lW(\cos\theta_1 - \cos\theta_2)}{2N(\theta_1 + \theta_2)} + \frac{KG(\theta_1^2 + \theta_2^2)}{4NL(\theta_1 + \theta_2)}} \quad (5)$$

This is the general equation for bearing friction torque with the music wire torsion included. It is a function of:
a. Pendulum Weight
b. Pendulum Length
c. Initial and Final Pendulum Angles
d. The Cycles of Oscillation Between $\theta_1$ and $\theta_2$
e. Music Wire Properties The first term in Equation (5) is bearing friction and the second is music wire torque.

For a design where:
$\theta_1 = 20°$
$\theta_2 = 10°$
$K = \pi/2 \, (r)^4$
$r = 0.013/2$ (0.013 diameter music wire)
$G = 12 \times 10^6$ psi
$L = 6.15$ in.
$l = 6.0$ in.

We get:

$$T = \frac{-.9540}{N}[.2707W + .00025]$$

Neglect Music Wire Torque

This reveals that the torque change in the music wire between a 20 and 10 degree angle is negligible (0.09% of friction at W = 1 lb) compared to bearing friction.

As a result:

$$\boxed{T_b = -.2583 \frac{W}{N} \text{ in-Lbf}} \quad (6)$$

This is the bearing frictional torque equation for the above design which is currently in use.

This provides an indication of the bearing loads in accordance with the preceding. This enables the precession rate effect of the bearings on a particular instrument such as a gyroscope or the like to be precalculated or predetermined. The vacuum jar reduces or eliminates the effect of wind on the test results.

While we have illustrated and described our invention by means of specific embodiments, it is to be understood that numerous changes and modifications may be made therein without departing from the spirit and scope of the invention as defined in the appended claims.

What is claimed:

1. A bearing friction tester for a bearing having a concentric outer race, a concentric inner race and at least one ring of ball bearings disposed therebetween, said inner and outer races defining a rotational axis and each ring of ball bearings defining a bearing plane perpendicular to said rotation axis, said tester comprising:
   a base;
   a mast mounted on and extending upward from said base;
   a support arm mounted on said mast adjacent an upper end thereof, said support arm extending outward from said mast;
   bearing support means mounted on said support arm for rigidly fixing and supporting an outer race of a bearing under test and restraining said outer race against movement;
   load support means for mounting on an inner race of the bearing under test for coupling a radial force and a rotational axis force to the inner race of the bearing under test;
   a pendulum attached to said load support means, said pendulum extending downwardy from said load support means so as to swing in a radial load plane said load support means and said pendulum being structured such that when said load support means is attached to said inner race, said radial load plane is perpendicular to said rotational axis and is positioned along said rotational axis substantially centrally between the bearing planes of the bearing under test, said pendulum providing a substantially radial force to the inner race of the bearing under test; and
   lateral load means attached to said load support means for providing an axial force along said rotational axis to the inner race of the bearing under test.

2. The bearing friction tester of claim 1 including closure means for sealingly enclosing said friction tester.

3. The bearing friction tester of claim 1 including:
   means for establishing a predetermined swing to said pendulum, and
   means for measuring the rate of decay of the swing of said pendulum.

4. The bearing friction tester of claim 1 including means for latching said pendulum in a cocked position, and means for remotely releasing said latching means.

5. The bearing friction tester of claim 1 including a optoelectric cell for sensing the swing of said pendulum.

6. The bearing friction tester of claim 1 wherein said lateral load means comprises:
   weight means for providing a selectively adjustable weight force; and
   high tensile low torque connecting means connected to said weight means and said load support means for providing said weight force to the inner race of a bearing under test as said rotational axis force.

7. The bearing friction tester of claim 6 wherein said high tensile low torque connecting means is a wire.

8. The bearing friction tester of claim 4 including:
   means for establishing a predetermined swing of said pendulum, and
   means for measuring the rate of decay of the swing of said pendulum.

9. The bearing friction tester of claim 5 including means for determining the period of the pendulum.

10. The bearing friction tester of claim 8 wherein said lateral load means comprises:
    weight means for providing a selectively adjustable weight force; and high tensile low torque connecting means connected to said weight means said load support means for providing said weight force to the inner race of a bearing under test as said rotational axis force.

11. The bearing friction tester of claim 10 including closure means for sealingly enclosing said friction tester.

12. The bearing friction tester of claim 10 including means for determining the period of the pendulum.

* * * * *